(12) United States Patent
Pursifull et al.

(10) Patent No.: US 11,739,706 B2
(45) Date of Patent: Aug. 29, 2023

(54) METHODS AND SYSTEMS FOR IMPROVING FUEL INJECTION REPEATABILITY

(71) Applicant: Ford Global Technologies, LLC, Dearborn, MI (US)

(72) Inventors: Ross Pursifull, Dearborn, MI (US); Rani Kiwan, Canton, MI (US); Paul Hollar, Belleville, MI (US); Joseph Thomas, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 114 days.

(21) Appl. No.: 17/304,721

(22) Filed: Jun. 24, 2021

(65) Prior Publication Data
US 2022/0412283 A1    Dec. 29, 2022

(51) Int. Cl.
*F02D 41/24* (2006.01)
*F02D 41/20* (2006.01)
*F02D 41/22* (2006.01)

(52) U.S. Cl.
CPC ......... *F02D 41/2467* (2013.01); *F02D 41/20* (2013.01); *F02D 41/221* (2013.01); *F02D 41/2477* (2013.01); *F02D 2041/2027* (2013.01); *F02D 2041/224* (2013.01); *F02D 2200/0602* (2013.01); *F02D 2200/0616* (2013.01)

(58) Field of Classification Search
CPC .... F02D 41/2467; F02D 41/20; F02D 41/221; F02D 41/2477; F02D 2041/2027; F02D 2041/224; F02D 2200/0602; F02D 2200/0616
See application file for complete search history.

(56) References Cited

U.S. PATENT DOCUMENTS

| | | | |
|---|---|---|---|
| 4,319,327 | A | 3/1982 | Higashiyama et al. |
| 5,176,122 | A | 1/1993 | Ito |
| 5,633,458 | A | 5/1997 | Pauli et al. |
| 6,088,647 | A | 7/2000 | Hemberger et al. |
| 6,250,285 | B1 | 6/2001 | Takase |
| 6,349,702 | B1 | 2/2002 | Nishiyama |
| 6,463,910 | B2 | 10/2002 | Nishiyama |
| 6,964,261 | B2 | 11/2005 | Warne et al. |
| 7,717,088 | B2 | 5/2010 | Thomas |
| 7,841,319 | B2 | 11/2010 | Thomas |

(Continued)

FOREIGN PATENT DOCUMENTS

| | | | |
|---|---|---|---|
| DE | 102015225504 A1 | * | 6/2017 |
| EP | 1136686 A2 | | 9/2001 |
| EP | 1647695 A2 | | 4/2006 |

OTHER PUBLICATIONS

Pursifull, R. et al., "System and Method for Injecting Fuel to an Engine," U.S. Appl. No. 17/017,791, filed Sep. 11, 2020, 33 pages.

(Continued)

*Primary Examiner* — Logan M Kraft
*Assistant Examiner* — Susan E Scharpf
(74) *Attorney, Agent, or Firm* — Vincent Mastrogiacomo; McCoy Russell LLP (57) ABSTRACT

Methods and systems are provided for balancing a plurality of fuel injectors. In one example, a method includes adjusting port-fuel injecting parameters in response to a learned direct injector fueling error.

17 Claims, 7 Drawing Sheets

(56) References Cited

U.S. PATENT DOCUMENTS

| | | | |
|---|---|---|---|
| 9,593,637 B2* | 3/2017 | Surnilla | F02D 41/221 |
| 10,240,554 B2 | 3/2019 | Sanborn et al. | |
| 10,294,882 B2 | 5/2019 | Sanborn et al. | |
| 10,934,955 B2 | 3/2021 | Pursifull et al. | |
| 2016/0131072 A1* | 5/2016 | Surnilla | F02D 41/3094 701/107 |
| 2016/0153386 A1* | 6/2016 | Ranga | F02D 41/1454 701/104 |
| 2016/0153387 A1* | 6/2016 | Ranga | F02D 41/2467 701/104 |
| 2016/0153390 A1* | 6/2016 | Ranga | F02D 41/2438 701/104 |
| 2016/0153391 A1* | 6/2016 | Ranga | F02D 41/2467 701/104 |
| 2018/0051646 A1* | 2/2018 | Ranga | F02D 41/3094 |
| 2018/0051647 A1* | 2/2018 | Ranga | F02D 41/2467 |
| 2018/0328304 A1* | 11/2018 | Pursifull | F02D 41/2467 |
| 2018/0328306 A1* | 11/2018 | Pursifull | F02D 41/3845 |
| 2020/0116099 A1 | 4/2020 | Surnilla et al. | |
| 2021/0017928 A1 | 1/2021 | Thomas et al. | |

OTHER PUBLICATIONS

Pursifull, R. et al., "Method and System for Adjusting Operation of a Fuel Injector," U.S. Appl. No. 17/039,589, filed Sep. 30, 2020, 36 pages.

Kiwan, R. et al., "Method and System for Fuel Injector Balancing," U.S. Appl. No. 17/093,384, filed Nov. 9, 2020, 62 pages.

Pursifull, R. et al., "Method and System for Multiple Injections," U.S. Appl. No. 17/157,849, filed Jan. 25, 2021, 50 pages.

Oshinsky, D. et al., "Methods and Systems for Fuel Injection Control," U.S. Appl. No. 17/198,106, filed Mar. 10, 2021, 55 pages.

Campbell, I. et al., "Methods and Systems for Improving Fuel Injection," U.S. Appl. No. 17/203,606, filed Mar. 16, 2021, 32 pages.

Pursifull, R. et al., "Methods and Systems for Compensating for Fuel Injector Closing Time," U.S. Appl. No. 17/204,254, filed Mar. 17, 2021, 43 pages.

Pursifull, R. et al., "Methods and Systems for Improving Fuel Injection Repeatability," U.S. Appl. No. 17/205,384, filed Mar. 18, 2021, 44 pages.

Kiwan, R. et al., "Methods and Systems for Controlling Fuel Injector Holding Current," U.S. Appl. No. 17/209,014, filed Mar. 22, 2021, 40 pages.

Pursifull, R. et al., "Method and System for Operating a Fuel Injector," U.S. Appl. No. 17/240,165, filed Apr. 26, 2021, 34 pages.

Kiwan, R. et al., "Methods and Systems for Improving Fuel Injection Repeatability," U.S. Appl. No. 17/302,496, filed May 4, 2021, 63 pages.

Kiwan, R. et al., "Methods and Systems for Fuel Injector Balancing," U.S. Appl. No. 17/302,498, filed May 5, 2021, 54 pages.

Pursifull, R. et al., "Methods and Systems for Improving Fuel Injection Repeatability," U.S. Appl. No. 17/303,085, filed May 19, 2021, 43 pages.

Pursifull, R. et al., "Methods and Systems for Improving Fuel Injection Repeatability," U.S. Appl. No. 17/304,721, filed Jun. 24, 2021, 48 pages.

Pursifull, R. et al., "Methods and Systems for Improving Fuel Injection Repeatability," U.S. Appl. No. 17/304,728, filed Jun. 24, 2021, 47 pages.

* cited by examiner

METHODS AND SYSTEMS FOR IMPROVING FUEL INJECTION REPEATABILITY

FIELD

The present description relates generally to systems and methods for improving accuracy of an amount of fuel that is injected to an engine via sensing a fuel rail pressure drop for at least one injector.

BACKGROUND/SUMMARY

Engines may be configured with direct fuel injectors (DI) for injecting fuel directly into an engine cylinder and/or port fuel injectors (PFI) for injecting fuel into an intake port of the engine cylinder. Fuel injectors may develop piece-to-piece variability over time due to imperfect manufacturing processes and/or injector aging, for example. Injector performance may degrade (e.g., injector becomes clogged) which may further increase piece-to-piece injector variability. Additionally or alternatively, injector to injector flow differences may lead to disparate injector aging between injectors. As a result, the actual amount of fuel injected to each cylinder of an engine may not be the desired amount and the difference between the actual and desired amounts may vary between injectors. Variability in a fuel injection amount between cylinders may result in reduced fuel economy, undesired tailpipe emissions, torque variation that causes a lack of perceived engine smoothness, and an overall decrease in engine efficiency. Engines operating with a dual injector system, such as dual fuel or PFDI systems, may have a higher number of fuel injectors resulting in greater possibility for injector variability. It may be desirable to balance the injectors so that all injectors inject the same, or in other words, have a similar error (e.g., all injectors at 1% under fueling).

Various approaches use fuel rail pressure drop across each injector to correct each injector's transfer function. One example approach is shown by Surnilla et al. in U.S. 2020/0116099. Therein, fuel rail pressure samples collected during a noisy zone of injector operation are discarded while samples collected during a quiet zone are averaged to determine an injector pressure. The injector pressure is then used to infer injection volume, injector error, and update an injector transfer function. Another example approach is shown by Surnilla et al. in U.S. Pat. No. 9,593,637. Therein, a fuel injection amount for an injector is determined based on a difference in fuel rail pressure (FRP) measured before injector firing and FRP after injector firing.

However, the inventors herein have recognized potential issues with such systems. As one example, average inter-injection pressure is used to estimate the fuel rail pressure drop across each injector even for engines with a higher number of cylinders and corresponding injection events. The inter-injection period may be based on factors such as number of cylinders, engine speed, and injection pulse width. The error learned during these conditions may be applied to future direct injector parameters. However, due to a direct injector transfer function shape, applying these corrections to the direct injector fueling parameters may not result in the correction desired and fueling errors still being present. Learning the direct injector transfer function shape may be time consuming and relatively inaccurate, thus, a method for correcting the errors quickly is still desired.

The inventors herein have recognized the above-mentioned disadvantages and have developed a method for adjusting a port-fuel injector fueling parameter based on a learned fueling error of a plurality of direct injectors. In this way, a non-smooth injector transfer function shape of the direct injectors may be ignored while fueling errors are still corrected.

As one example, an injector transfer function shape of the port-fuel injectors may be relatively affine. Thus, adjusting a PW of the port-fuel injectors may result in a desired fueling correction, while adjusting the PW of the direct injectors may still include some amount of error. By doing this, cylinder-to-cylinder fueling may be balanced via learning direct injector errors and applying fueling corrections based on the direct injector errors to port-fuel injectors.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for determining a transfer function shape for a plurality of injectors via a PBIB diagnostic. The transfer function shape, which may be substantially identical for a group of similar injectors of an engine, such as the engine of FIG. 1, may be learned. The PBIB diagnostic may learn a drop in FRP for a fuel system, such as the fuel system of FIG. 2.

Figure 3A:
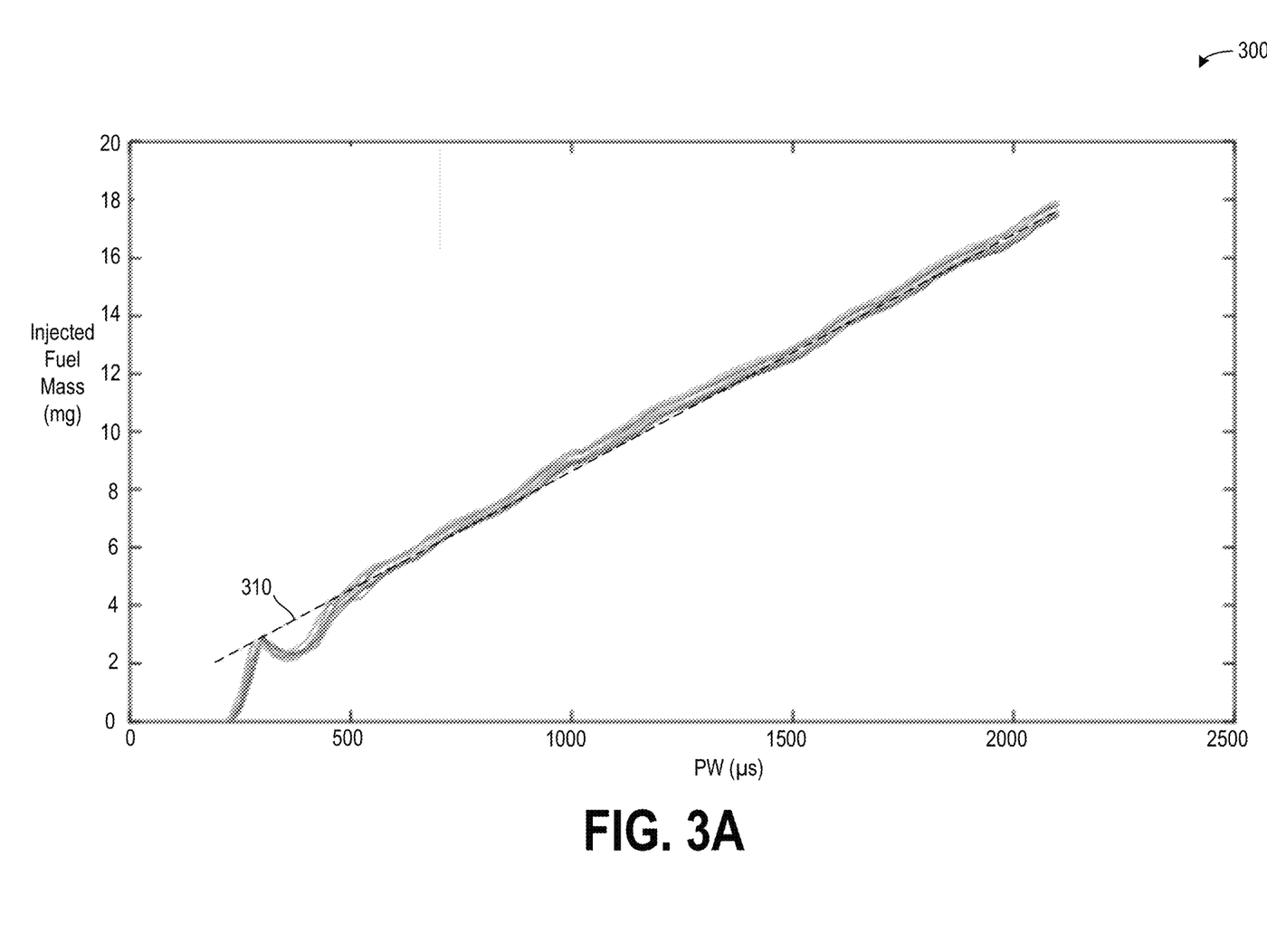
FIG. 3A shows a PBIB-determined fuel mass delivered or a plurality of injectors
Figure 3B:
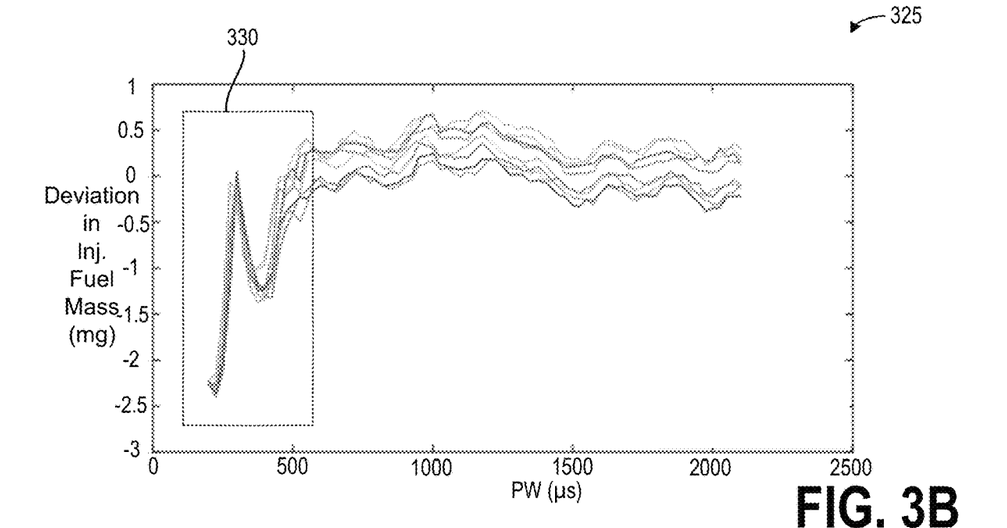
FIG. 3B shows a transfer function shape for the plurality of injectors.
Figure 3C:
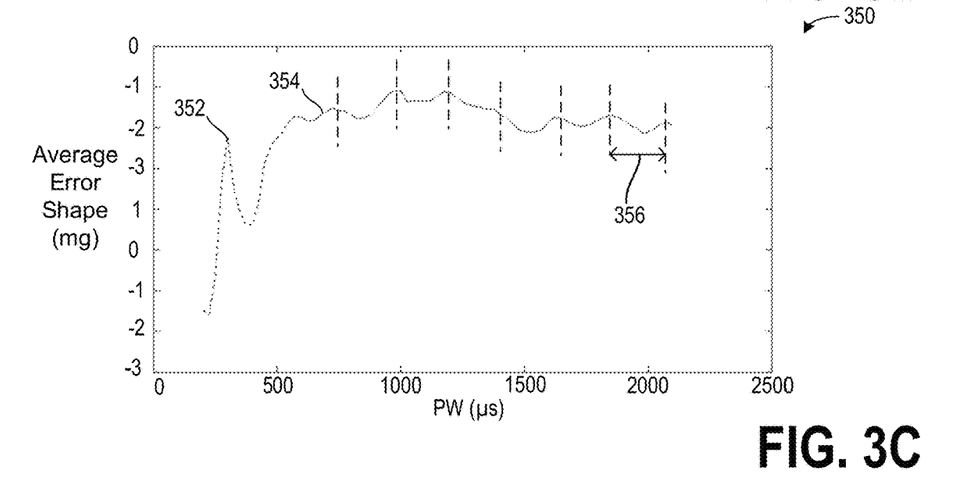
FIG. 3C shows an average transfer function shape for the plurality of injectors.
Figure 3D:
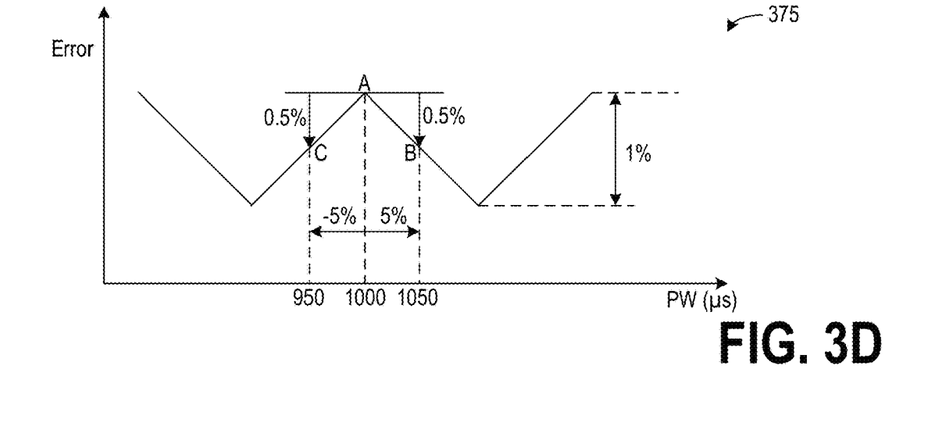
FIG. 3D shows a period of the transfer function shape along with example fueling corrections without knowing the transfer function shape.

In one example of the present disclosure, the PBIB diagnostic may learn the injector transfer function shape along with a fuel mass delivered, as shown in FIG. 3A. Transfer function shapes of a plurality of injectors are shown in FIG. 3B and an average injector transfer function shape is shown in FIG. 3C. The injector transfer function shape may be a zig-zag shape following a threshold PW, the zig-zag shape and its periodicity are shown in FIG. 3D.

Figure 4:
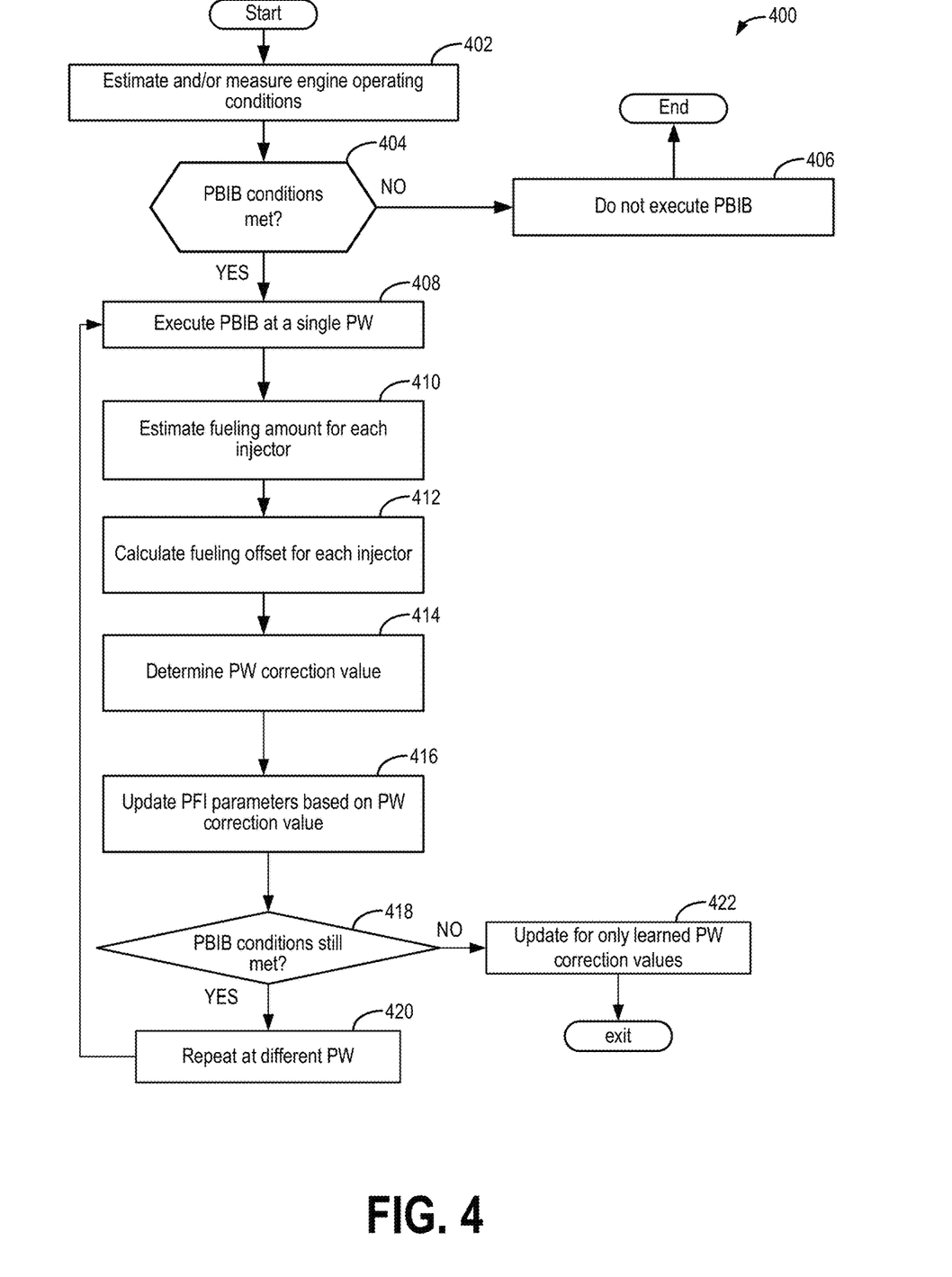
FIG. 4 shows a method for executing a PBIB diagnostic for determining a DI fueling offset.
Figure 5:
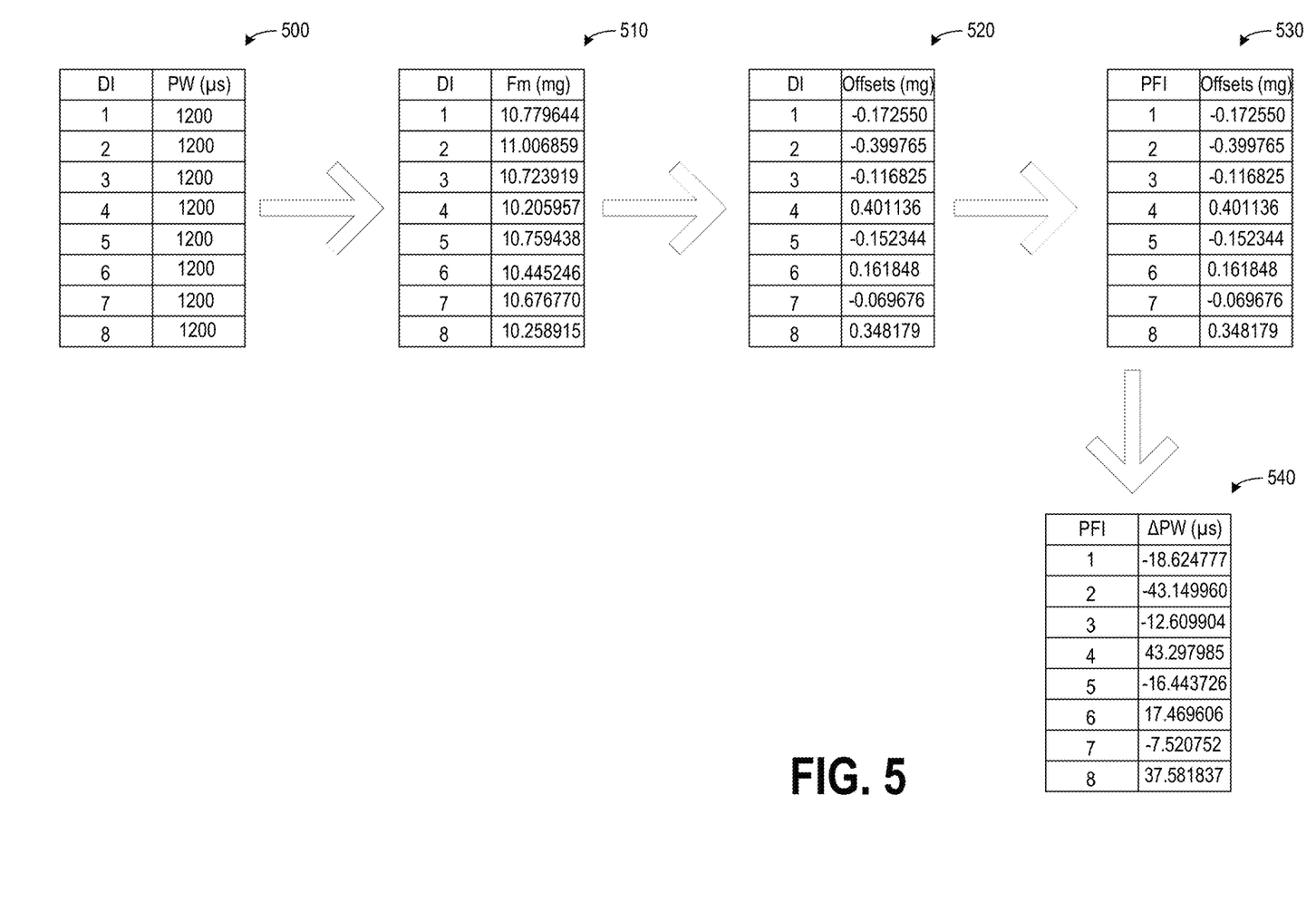
FIG. 5 shows various PBIB values for a group of DI and associated adjustments to PFI parameters.
Figure 6:
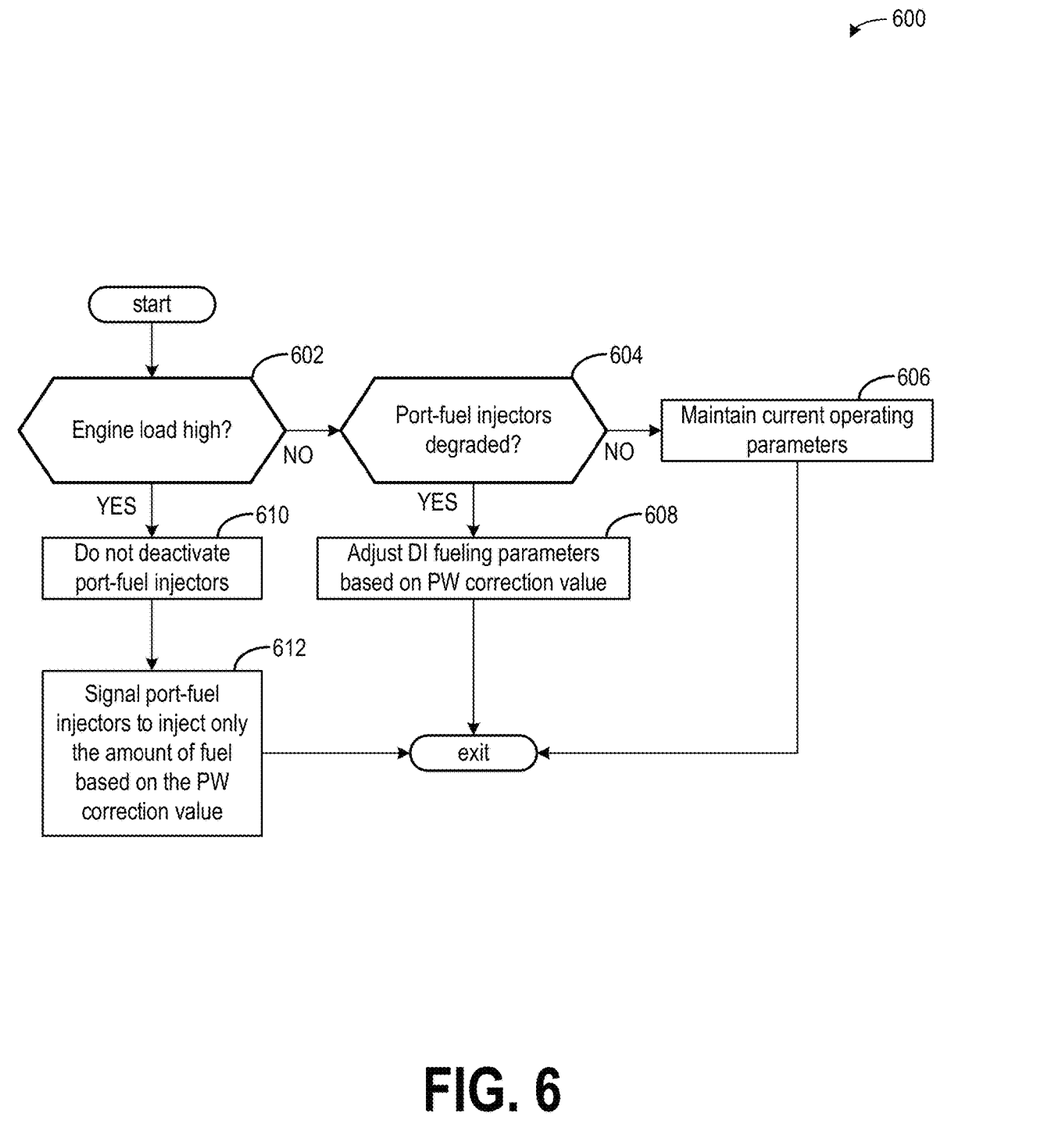
FIG. 6 shows a method for adjusting engine fueling conditions in response to an engine load or port-fuel injector degradation.

A method for executing a PBIB diagnostic is illustrated in FIG. 4. The PBIB diagnostic may determine a DI offset, wherein a PW correction based on the offset may be calculated. The PBIB diagnostic may further include applying the PW correction to corresponding PFI. Data values associated with individual DIs determined during the PBIB diagnostic are illustrated in FIG. 5. A method for adjusting engine fueling conditions in response to an engine load or port-fuel injector degradation is shown in FIG. 6.

Figure 1:
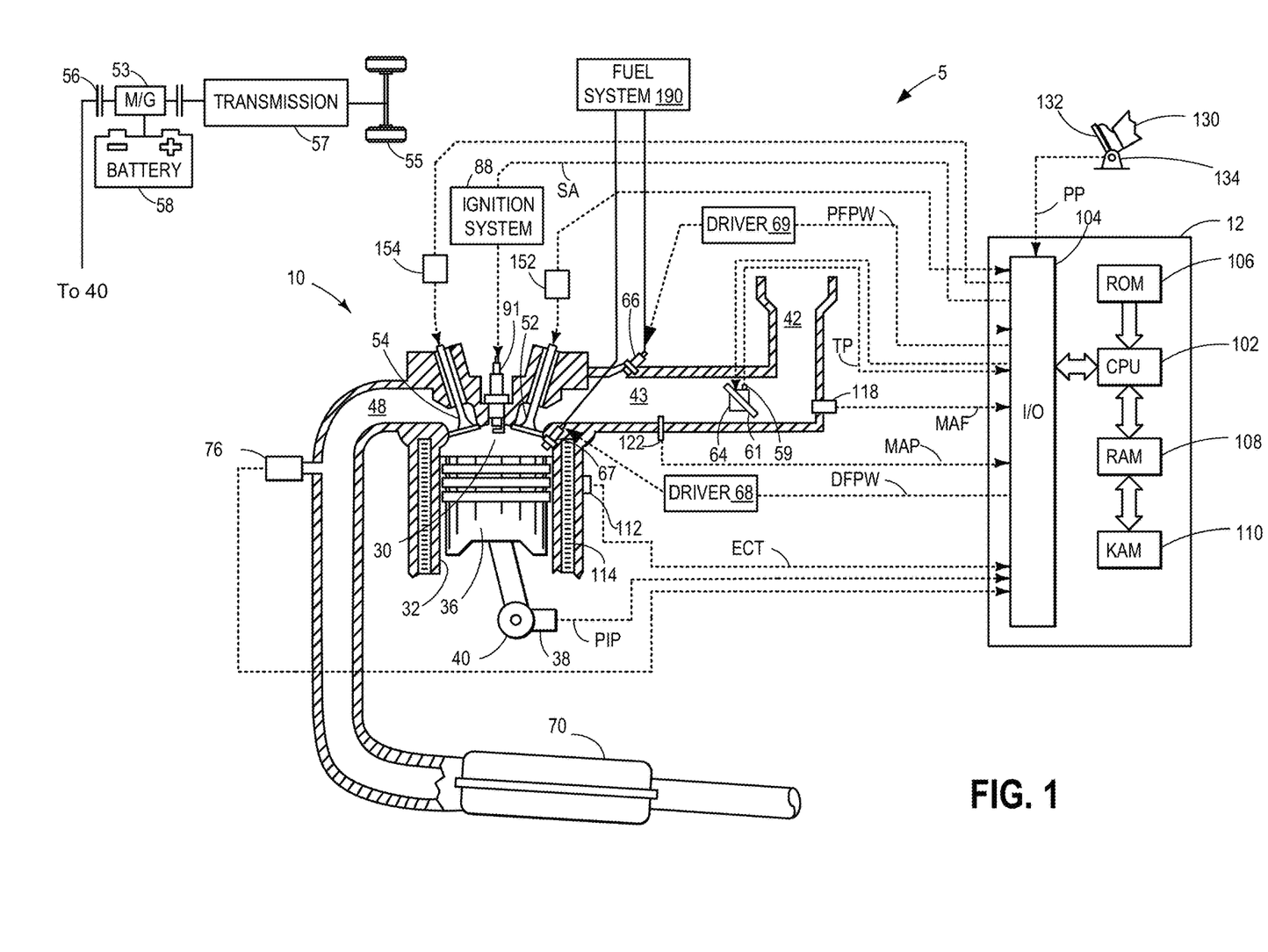
FIG. 1 shows a schematic depiction of an example propulsion system including an engine.
Figure 2:
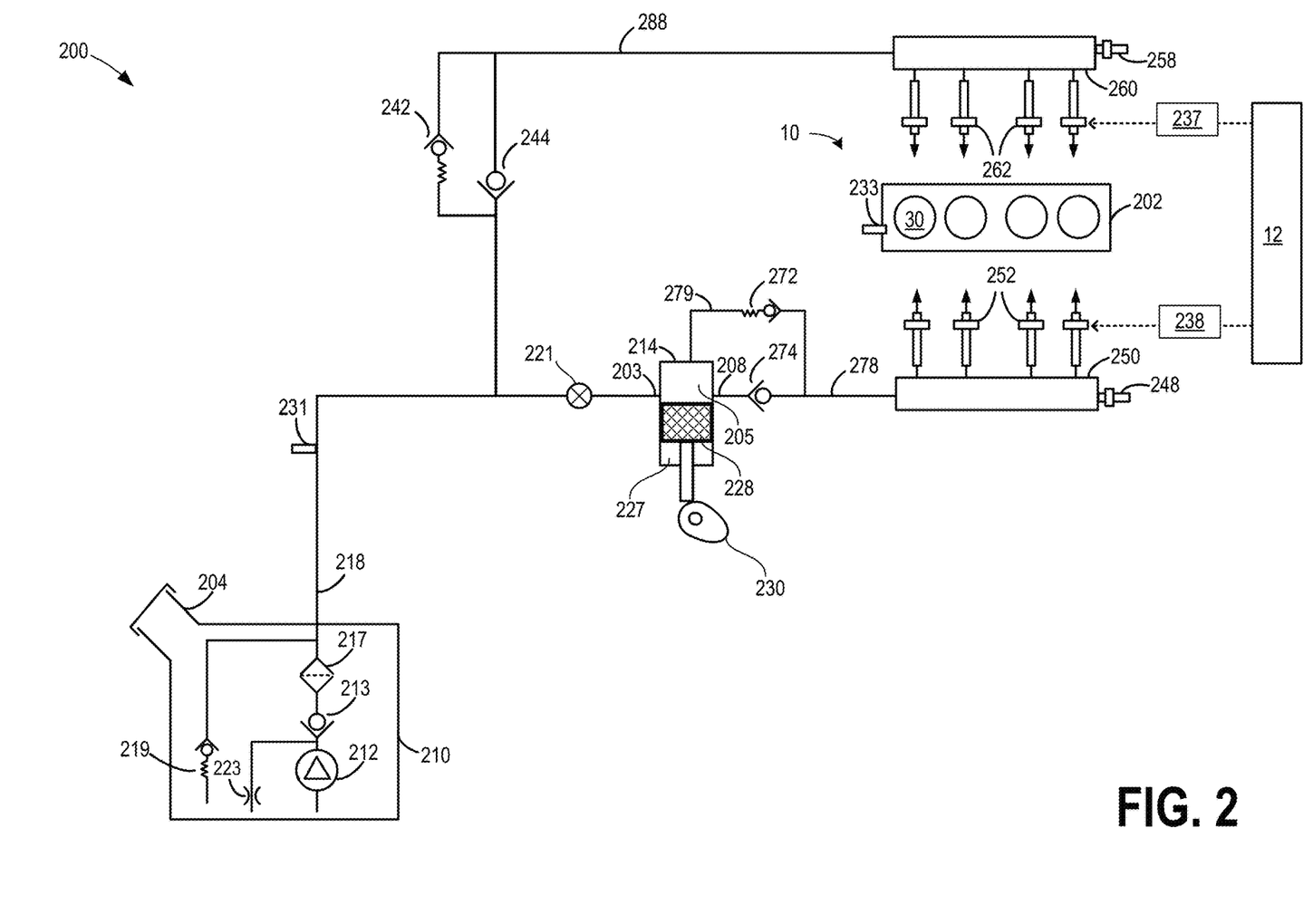
FIG. 2 shows an example fuel system coupled to the engine of FIG. 1.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 shows a schematic depiction of a spark ignition internal combustion engine 10 with a dual injector system, where engine 10 is configured with both direct injection and port fuel injection. As such, engine 10 may be referred to as a port-fuel direct inject (PFDI) engine. Engine 10 may be included in a vehicle 5. Engine 10 comprises a plurality of cylinders of which one cylinder 30 (also known as combustion chamber 30) is shown in FIG. 1. Cylinder 30 of engine 10 is shown including combustion chamber walls 32 with piston 36 positioned therein and connected to crankshaft 40. A starter motor (not shown) may be coupled to crankshaft 40 via a flywheel (not shown), or alternatively, direct engine starting may be used.

Combustion chamber 30 is shown communicating with intake manifold 43 and exhaust manifold 48 via intake valve 52 and exhaust valve 54, respectively. In addition, intake manifold 43 is shown with throttle 64 which adjusts a position of throttle plate 61 to control airflow from intake passage 42.

Intake valve 52 may be operated by controller 12 via actuator 152. Similarly, exhaust valve 54 may be activated by controller 12 via actuator 154. During some conditions, controller 12 may vary the signals provided to actuators 152 and 154 to control the opening and closing of the respective intake and exhaust valves. The position of intake valve 52 and exhaust valve 54 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 30 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

In another embodiment, four valves per cylinder may be used. In still another example, two intake valves and one exhaust valve per cylinder may be used.

Combustion chamber 30 can have a compression ratio, which is the ratio of volumes when piston 36 is at bottom center to top center. In one example, the compression ratio may be approximately 9:1. However, in some examples where different fuels are used, the compression ratio may be increased. For example, it may be between 10:1 and 11:1 or 11:1 and 12:1, or greater.

In some embodiments, each cylinder of engine 10 may be configured with one or more fuel injectors for providing fuel thereto. As shown in FIG. 1, cylinder 30 includes two fuel injectors, 66 and 67. Fuel injector 67 is shown directly coupled to combustion chamber 30 and positioned to directly inject therein in proportion to the pulse width of signal DFPW received from controller 12 via electronic driver 68. In this manner, direct fuel injector 67 provides what is known as direct injection (hereafter referred to as "DI") of fuel into combustion chamber 30. While FIG. 1 shows injector 67 as a side injector, it may also be located overhead of the piston, such as near the position of spark plug 91. Such a position may improve mixing and combustion due to the lower volatility of some alcohol based fuels. Alternatively, the injector may be located overhead and near the intake valve to improve mixing.

Fuel injector 66 is shown arranged in intake manifold 43 in a configuration that provides what is known as port injection of fuel (hereafter referred to as "PFI") into the intake port upstream of cylinder 30 rather than directly into cylinder 30. Port fuel injector 66 delivers injected fuel in proportion to the pulse width of signal PFPW received from controller 12 via electronic driver 69.

Fuel may be delivered to fuel injectors 66 and 67 by a high pressure fuel system 190 including a fuel tank, fuel pumps, and fuel rails. Further, the fuel tank and rails may each have a pressure transducer providing a signal to controller 12. In this example, both direct fuel injector 67 and port fuel injector 66 are shown. However, certain engines may include only one kind of fuel injector such as either direct fuel injector or port fuel injector. Fuel injection to each cylinder may be carried out via direct injectors (in absence of port injectors) or port direct injectors (in absence of direct injectors). An example fuel system including fuel pumps and injectors and fuel rails is elaborated on with reference to FIG. 2.

Returning to FIG. 1, exhaust gases flow through exhaust manifold 48 into emission control device 70 which can include multiple catalyst bricks, in one example. In another example, multiple emission control devices, each with multiple bricks, can be used. Emission control device 70 can be a three-way type catalyst in one example.

Exhaust gas sensor 76 is shown coupled to exhaust manifold 48 upstream of emission control device 70 (where sensor 76 can correspond to a variety of different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS may be used to advantage during feedback air/fuel control to maintain average air/fuel at stoichiometry during a stoichiometric homogeneous mode of operation. A single exhaust gas sensor may serve 1, 2, 3, 4, 5, or other number of cylinders.

Distributorless ignition system 88 provides ignition spark to combustion chamber 30 via spark plug 91 in response to spark advance signal SA from controller 12.

Controller 12 may cause combustion chamber 30 to operate in a variety of combustion modes, including a homogeneous air/fuel mode and a stratified air/fuel mode by controlling injection timing, injection amounts, spray patterns, etc. Further, combined stratified and homogenous mixtures may be formed in the chamber. In one example, stratified layers may be formed by operating injector 67 during a compression stroke. In another example, a homogenous mixture may be formed by operating one or both of injectors 66 and 67 during an intake stroke (which may be open valve injection). In yet another example, a homogenous mixture may be formed by operating one or both of injectors 66 and 67 before an intake stroke (which may be closed valve injection). In still other examples, multiple injections from one or both of injectors 66 and 67 may be used during one or more strokes (e.g., intake, compression, exhaust, etc.). Even further examples may be where different injection timings and mixture formations are used under different conditions, as described below.

Controller 12 can control the amount of fuel delivered by fuel injectors 66 and 67 so that the homogeneous, stratified, or combined homogenous/stratified air/fuel mixture in chamber 30 can be selected to be at stoichiometry, a value rich of stoichiometry, or a value lean of stoichiometry. Further, controller 12 may be configured to adjust a fuel injection pattern of the fuel injectors 66 and 67 during a pressure-based injector balancing (PBIB) diagnostic. The controller 12 may include instructions that when executed cause the controller 12 to adjust an injection pattern to increase an occurrence of an injection being preceded by a same cylinder bank injection. The controller 12 may be further configured to monitor a fuel rail pressure (FRP) of an inter-injection period during the PBIB diagnostic. In one example, the controller 12 may be configured to learn only FRPs of inter-injection periods for injections preceded by a same-cylinder bank injection while ignoring FRPs for injections preceded by an opposite-cylinder bank injection. Additionally or alternatively, the controller 12 may signal to skip injections from the opposite-cylinder bank, thereby increasing the occurrence of injections being preceded by a same-cylinder bank injection, which may increase a rate in which FRP data is accrued.

As described above, FIG. 1 merely shows one cylinder of a multi-cylinder engine, and that each cylinder has its own set of intake/exhaust valves, fuel injectors, spark plugs, etc. Also, in the example embodiments described herein, the engine may be coupled to a starter motor (not shown) for starting the engine. The starter motor may be powered when the driver turns a key in the ignition switch on the steering column, for example. The starter is disengaged after engine start, for example, by engine 10 reaching a predetermined speed after a predetermined time. Further, in the disclosed embodiments, an exhaust gas recirculation (EGR) system may be used to route a desired portion of exhaust gas from exhaust manifold 48 to intake manifold 43 via an EGR valve (not shown). Alternatively, a portion of combustion gases may be retained in the combustion chambers by controlling exhaust valve timing.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 53. Electric machine 53 may be a motor or a motor/generator. Crankshaft 40 of engine 10 and electric machine 53 are connected via a transmission 57 to vehicle wheels 55 when one or more clutches 56 are engaged. In the depicted example, a first clutch 56 is provided between crankshaft 40 and electric machine 53, and a second clutch 56 is provided between electric machine 53 and transmission 57. Controller 12 may send a signal to an actuator of each clutch 56 to engage or disengage the clutch, so as to connect or disconnect crankshaft 40 from electric machine 53 and the components connected thereto, and/or connect or disconnect electric machine 53 from transmission 57 and the components connected thereto. Transmission 57 may be a gearbox, a planetary gear system, or another type of transmission. The powertrain may be configured in various manners including as a parallel, a series, or a series-parallel hybrid vehicle.

Electric machine 53 receives electrical power from a traction battery 58 to provide torque to vehicle wheels 55. Electric machine 53 may also be operated as a generator to provide electrical power to charge battery 58, for example during a braking operation.

Controller 12 is shown in FIG. 1 as a conventional microcomputer including: central processing unit (CPU) 102, input/output (I/O) ports 104, read-only memory (ROM) 106, random access memory (RAM) 108, keep alive memory (KAM) 110, and a conventional data bus. Controller 12 is shown receiving various signals from sensors coupled to engine 10, in addition to those signals previously discussed, including measurement of inducted mass air flow (MAF) from mass air flow sensor 118; engine coolant temperature (ECT) from temperature sensor 112 coupled to cooling sleeve 114; a profile ignition pickup signal (PIP) from Hall effect sensor 38 coupled to crankshaft 40; and throttle position TP from throttle position sensor 59 and a Manifold Absolute Pressure Signal (MAP) from sensor 122. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In one example, sensor 38, which is also used as an engine speed sensor, produces a predetermined number of equally spaced pulses every revolution of the crankshaft. The controller 12 receives signals from the various sensors of FIG. 1 and employs the various actuators of FIG. 1, such as throttle 64, fuel injectors 66 and 67, spark plug 91, etc., to adjust engine operation based on the received signals and instructions stored on a memory of the controller. As one example, the controller may send a pulse width signal to the port injector and/or the direct injector to adjust a timing of fuel injection and an amount of fuel delivered to a cylinder via an injector.

FIG. 2 schematically depicts an example embodiment 200 of a fuel system, such as fuel system 190 of FIG. 1. Fuel system 200 may be operated to deliver fuel to an engine, such as engine 10 of FIG. 1. Fuel system 200 may be operated by a controller to perform some or all of the operations described with reference to the methods of FIGS. 4 and 6. Components previously introduced are similarly numbered in FIG. 2. Engine 10 is shown with cylinder 30 arranged in a cylinder bank 202. The cylinder bank 202 may be one of a plurality of cylinder banks of the engine 10, each of the banks identical in configuration.

Fuel system 200 includes a fuel storage tank 210 for storing the fuel on-board the vehicle, a lower pressure fuel pump (LPP) 212 (herein also referred to as fuel lift pump 212), and a higher pressure fuel pump (HPP) 214 (herein also referred to as fuel injection pump 214). Fuel may be provided to fuel tank 210 via fuel filling passage 204. In one example, LPP 212 may be an electrically-powered lower pressure fuel pump disposed at least partially within fuel tank 210. LPP 212 may be operated by a controller 12 (e.g., controller 12 of FIG. 1) to provide fuel to HPP 214 via fuel passage 218. LPP 212 can be configured as what may be referred to as a fuel lift pump. As one example, LPP 212 may be a turbine (e.g., centrifugal) pump including an electric (e.g., DC) pump motor, whereby the pressure increase across the pump and/or the volumetric flow rate through the pump may be controlled by varying the electrical power provided to the pump motor, thereby increasing or decreasing the motor speed. For example, as the controller reduces the electrical power that is provided to lift pump 212, the volumetric flow rate and/or pressure increase across the lift pump may be reduced. The volumetric flow rate and/or pressure increase across the pump may be increased by increasing the electrical power that is provided to lift pump 212. As one example, the electrical power supplied to the lower pressure pump motor can be obtained from an alternator or other energy storage device on-board the vehicle (not shown), whereby the control system can control the electrical load that is used to power the lower pressure pump. Thus, by varying the voltage and/or current provided to the lower pressure fuel pump, the flow rate and pressure of the fuel provided at the inlet of the higher pressure fuel pump 214 is adjusted.

LPP 212 may be fluidly coupled to a filter 217, which may remove small impurities contained in the fuel that could potentially damage fuel handling components. A check valve 213, which may facilitate fuel delivery and maintain fuel line pressure, may be positioned fluidly upstream of filter 217. With check valve 213 upstream of the filter 217, the compliance of low-pressure passage 218 may be increased since the filter may be physically large in volume. Furthermore, a pressure relief valve 219 may be employed to limit the fuel pressure in low-pressure passage 218 (e.g., the output from lift pump 212). Relief valve 219 may include a ball and spring mechanism that seats and seals at a specified pressure differential, for example. The pressure differential set-point at which relief valve 219 may be configured to open may assume various suitable values; as a non-limiting example, the set-point may be 6.4 bar or 5 bar (g). An orifice 223 may be utilized to allow for air and/or fuel vapor to bleed out of the lift pump 212. This bleed at orifice 223 may also be used to power a jet pump used to transfer fuel from one location to another within the tank 210. In one example, an orifice check valve (not shown) may be placed in series with orifice 223. In some embodiments, fuel system 200 may include one or more (e.g., a series) of check valves fluidly coupled to low-pressure fuel pump 212 to impede fuel from leaking back upstream of the valves. In this context, upstream flow refers to fuel flow traveling from fuel rails 250, 260 towards LPP 212 while downstream flow refers to the nominal fuel flow direction from the LPP towards the HPP 214 and thereon to the fuel rails.

Fuel lifted by LPP 212 may be supplied at a lower pressure into a fuel passage 218 leading to an inlet 203 of HPP 214. HPP 214 may then deliver fuel into a first fuel rail 250 coupled to one or more fuel injectors of a first group of direct injectors 252 (herein also referred to as a plurality of first injectors). Fuel lifted by the LPP 212 may also be supplied to a second fuel rail 260 coupled to one or more fuel injectors of a second group of port injectors 262 (herein also referred to as a plurality of second injectors). HPP 214 may be operated to raise the pressure of fuel delivered to the first fuel rail above the lift pump pressure, with the first fuel rail coupled to the direct injector group operating with a high pressure. As a result, high pressure DI may be enabled while PFI may be operated at a lower pressure.

While each of first fuel rail 250 and second fuel rail 260 are shown dispensing fuel to four fuel injectors of the respective pluralities of first and second injectors 252, 262, it will be appreciated that each fuel rail 250, 260 may dispense fuel to any suitable number of fuel injectors. As one example, first fuel rail 250 may dispense fuel to one fuel injector of plurality of first injectors 252 for each cylinder of the engine while second fuel rail 260 may dispense fuel to one fuel injector of the plurality of second injectors 262 for each cylinder of the engine. Controller 12 can individually actuate each of the plurality of second injectors 262 via a port injection driver 237 and actuate each of the plurality of first injectors 252 via a direct injection driver 238. The controller 12, the drivers 237, 238 and other suitable engine system controllers can comprise a control system. While the drivers 237, 238 are shown external to the controller 12, it should be appreciated that in other examples, the controller 12 can include the drivers 237, 238 or can be configured to provide the functionality of the drivers 237, 238.

HPP 214 may be an engine-driven, positive-displacement pump. As one non-limiting example, HPP 214 may be a Bosch HDP5 high pressure pump, which utilizes a solenoid activated control valve (e.g., fuel volume regulator, magnetic solenoid valve, etc.) to vary the effective pump volume of each pump stroke. The outlet check valve of HPP is mechanically controlled and not electronically controlled by an external controller. HPP 214 may be mechanically driven by the engine in contrast to the motor driven LPP 212. HPP 214 includes a pump piston 228, a pump compression chamber 205 (herein also referred to as compression chamber), and a step-room 227. Pump piston 228 receives a mechanical input from the engine crank shaft or cam shaft via cam 230, thereby operating the HPP according to the principle of a cam-driven single-cylinder pump.

A lift pump fuel pressure sensor 231 may be positioned along fuel passage 218 between lift pump 212 and higher pressure fuel pump 214. In this configuration, readings from sensor 231 may be interpreted as indications of the fuel pressure of lift pump 212 (e.g., the outlet fuel pressure of the lift pump) and/or of the inlet pressure of higher pressure fuel pump. Readings from sensor 231 may be used to assess the operation of various components in fuel system 200, to determine whether sufficient fuel pressure is provided to higher pressure fuel pump 214 so that the higher pressure fuel pump ingests liquid fuel and not fuel vapor, and/or to minimize the average electrical power supplied to lift pump 212.

First fuel rail 250 includes a first fuel rail pressure sensor 248 for providing an indication of direct injection fuel rail pressure to the controller 12. Likewise, second fuel rail 260 includes a second fuel rail pressure sensor 258 for providing an indication of port injection fuel rail pressure to the controller 12. An engine speed sensor 233 (or an engine angular position sensor from which speed is deduced) can be used to provide an indication of engine speed to the controller 12. The indication of engine speed can be used to identify the speed of higher pressure fuel pump 214, since the pump 214 is mechanically driven by the engine, for example, via the crankshaft or camshaft. A solenoid controlled valve 221 may be included on the inlet side of pump 214. This solenoid controlled valve 221 may have two positions, a first pass through position and a second checked position. In the pass through position, no net pumping into the fuel rail 250 occurs. In the checked position, pumping occurs on the compression stroke of plunger/piston 228. This solenoid valve 221 is synchronously controlled with its drive cam to modulate the fuel quantity pumped into fuel rail 260.

First fuel rail 250 is coupled to an outlet 208 of HPP 214 along fuel passage 278. A check valve 274 and a pressure relief valve (also known as pump relief valve) 272 may be positioned between the outlet 208 of the HPP 214 and the first (DI) fuel rail 250. The pump relief valve 272 may be coupled to a bypass passage 279 of the fuel passage 278. Outlet check valve 274 opens to allow fuel to flow from the high pressure pump outlet 208 into a fuel rail only when a pressure at the outlet of direct injection fuel pump 214 (e.g., a compression chamber outlet pressure) is higher than the fuel rail pressure. The pump relief valve 272 may limit the pressure in fuel passage 278, downstream of HPP 214 and upstream of first fuel rail 250. For example, pump relief valve 272 may limit the pressure in fuel passage 278 to 200 bar. Pump relief valve 272 allows fuel flow out of the DI fuel rail 250 toward pump outlet 208 when the fuel rail pressure is greater than a predetermined pressure. Valves 244 and 242 work in conjunction to keep the low pressure fuel rail 260 pressurized to a pre-determined low pressure. Pressure relief valve 242 helps limit the pressure that can build in fuel rail 260 due to thermal expansion of fuel.

Based on engine operating conditions, fuel may be delivered by one or more of the pluralities of first and second injectors 252, 262. For example, during high load conditions, fuel may be delivered to a cylinder on a given engine cycle via only direct injection, wherein port injectors 262 are disabled (e.g., not injecting fuel). In another example, during mid-load conditions, fuel may be delivered to a cylinder on a given engine cycle via each of direct and port injection. As still another example, during low load conditions, engine starts, as well as warm idling conditions, fuel may be delivered to a cylinder on a given engine cycle via only port injection, wherein direct injectors 252 are disabled.

It is noted here that the high pressure pump 214 of FIG. 2 is presented as an illustrative example of one possible configuration for a high pressure pump. Components shown in FIG. 2 may be removed and/or changed while additional components not presently shown may be added to pump 214 while still maintaining the ability to deliver high-pressure fuel to a direct injection fuel rail and a port injection fuel rail.

Controller 12 can also control the operation of each of fuel pumps 212 and 214 to adjust an amount, pressure, flow rate, etc., of a fuel delivered to the engine. As one example, controller 12 can vary a pressure setting, a pump stroke amount, a pump duty cycle command, and/or fuel flow rate of the fuel pumps to deliver fuel to different locations of the fuel system. A driver (not shown) electronically coupled to controller 12 may be used to send a control signal to the low pressure pump, as required, to adjust the output (e.g., speed, flow output, and/or pressure) of the low pressure pump.

The fuel injectors may have injector-to-injector variability due to manufacturing, as well as due to age. Ideally, for improved fuel economy, injector balancing is desired wherein every cylinder has matching fuel injection amounts for matching fuel delivery commands. By balancing air and fuel injection into all cylinders, engine performance is improved. In particular, fuel injection balancing improves exhaust emission control via effects on exhaust catalyst operation. In addition, fuel injection balancing improves fuel economy because fueling richer or leaner than desired reduces fuel economy and results in an inappropriate ignition timing for the actual fuel-air ratio (relative to the desired ratio). Thus, getting to the intended relative fuel-air ratio has both a primary and secondary effect on maximizing the cylinder energy for the fuel investment.

Fueling errors can have various causes in addition to injector-to-injector variability. These include cylinder-to-cylinder misdistribution, shot-to-shot variation, and transient effects. In the case of injector-to-injector variability, each injector may include a different error between what is commanded to be dispensed and what is actually dispensed. As such, fuel injector balancing may result in an engine's torque evenness. Air and fuel evenness improves emission control.

In one example, during a PBIB diagnostic, one of the plurality of first injectors 252 or the plurality of second injectors 262 may be monitored. In one example, if the plurality of first injectors 252 is being balanced during the PBIB diagnostic, then the pump 214 may be sealed from the first fuel rail 250. Sealing the pump 214 from the first fuel rail 250 may include deactivating the pump 214, closing a valve, or the like. The PBIB diagnostic may further include adjusting an injection timing of the injectors such that injection overlap does not occur. Additionally or alternatively, an inter-injection period, which corresponds to a period of time between sequential injections, may meet a threshold duration, which may be based on a non-zero, positive number. The PBIB diagnostic may further include adjusting a fuel injection pattern such that only injections from a single cylinder bank occur. The FRP of the inter-injection period between injections of the same-cylinder bank may be learned by the controller and used to adjust an injector to injector variability. In some examples, FRPs of different cylinder banks may be learned, which may then be cumulatively used to correct injector to injector variability across multiple banks of the engine.

During balancing of the amount of fuel injected by a plurality of fuel injectors, a first fuel mass error of a second fuel injector may be estimated based on each of an estimated average fuel rail pressure during an inter-injection period between fuel injection by a first fuel injector and fuel injection by the second fuel injector and an estimated average fuel rail pressure during another inter-injection period between the fuel injection by the second fuel injector and fuel injection by a third fuel injector. Subsequent engine fueling may be adjusted based on the learned fuel mass errors.

Turning now to FIG. 3A, it shows a graph 300 illustrating a plurality of PBIB-measured fuel masses for a plurality of injectors. In one example, the plurality of PBIB-measured fuel masses includes eight different fuel masses at a PW range spanning 200 to 2100 µs for eight different injectors. Dashed line 310 illustrates a slope of the fuel masses through the PW range. In one example, the slope (e.g., dashed line 310) illustrates an affine based on a shape of the injected fuel masses of the plurality of injectors. Portions of the dashed line 310 may track a shape of the PBIB-measured fuel masses from PWs greater than 500 µs, which may correspond to a period outside of a ballistic/transition period, described in greater detail below.

Turning now to FIGS. 3B and 3C, they show first and second plots 325 and 350, respectively. First plot 325 graphs pulse-width (PW) along the abscissa and deviation in injected fuel mass along the ordinate. Dashed box 330 indicates a region including a ballistic period and a transition period of the fuel injection. In one example, the ballistic period, which may span from about 200 to 300 µs, may correspond to a period of an injection where an injector needle (e.g., a pintle) has not achieved full lift. The transition period, which may span from 300 to 600 µs, may be influenced by a rebound of the needle or an armature. The deviation in injected fuel mass may be based on the slope of dashed line 310 of FIG. 3A for an injected fuel mass for the plurality of injectors.

Following the ballistic/transition period (dashed box 330), the plurality of injectors shows a substantially similar shape in injected fuel mass deviation, but with different vertical offsets. Thus, while the values of the injected fuel mass deviations of the injectors may be different, a shape of the error for each injector may be substantially identical. In one example, the period following the ballistic/transition period corresponds to a holding phase of the injectors.

The second plot 350 illustrates an average error shape of the ballistic/transition period via dashed line 352 and after the ballistic/transition period via solid line 354. For the solid line 354, a peak-to-peak period 356 may be equal to approximately 200 µs. The peak-to-peak period 356 may be substantially identical for each of the injectors. Thus, for a given PW for all injectors, individual offsets may be sufficient to make the differences in a desired injected fuel mass and an actual injected fuel mass the same for all injectors. Thus, to learn the shape, different PWs may be commanded during PBIB to learn the injector error shape.

Turning now to FIG. 3D, it shows a plot 375 illustrating a portion of the zig-zag fuel injector error shape in the vicinity of PW=1000 µs. As an example, if the injector includes an error of −5% at PW=1000 µs, then the PW is increased by 5% to compensate for the error, moving from point A at PW=1000 µs to point B at PW=1050 µs. The PW increased by 50 µs moves the operating point from the peak of the zig-zag at point A to mid-way between the peak and a trough, due to the period of the zig-zag being about 200 µs. This may reduce the error due to the zig-zag by about 0.5%, since peak-to-peak amplitude is about 1% at PW=1000 µs. Thus, the fueling of the injectors is only increased by a total of 4.5% instead of 5%.

As another example, if the injector includes an error of 5% at PW=1000 µs, the PW may be decreased by 5% to compensate for the error, thereby moving the PW from point A to point C. Reducing the PW by 5% (e.g., 50 µs), the operating point from the peak of the zig-zag at point A is moved to mid-way between the peak and a trough at point C, resulting in an overall decrease in injector fueling being 5.5% instead of the desired 5%.

Thus, based on the example of FIG. 3D, applying a PW fueling correction to a DI may not correct a fueling offset. The inventors have found herein that by applying the fueling correction to a corresponding PFI, the desired amount of fuel may be delivered to the cylinder such that a fuel balancing of all cylinders of the engine is achieved. Associated PFI adjustments may include where a fuel mass correction is determined for a DI of a first cylinder. The fuel mass correction of the DI of the first cylinder is applied to only a PFI of the first cylinder. A fuel mass correction of a DI of a second cylinder may only be applied to a PFI of the second cylinder.

In one example of the present disclosure, the fuel mass error computed for a direct injector is applied to a port-fuel injector positioned to fuel a same cylinder. For example, if the direct injector is fueling 0.1 mg less than a desired fueling command, then the port-fuel injector fueling is increased by 0.1 mg. The PW correction learned for the direct injector may be adjusted to modify the port-fuel injector fueling to account for the direct injector fueling offset. In one example, the PW correction may be longer for the port-fuel injector than for the direct injector due to orifice size, fuel rail pressures, and the like.

Turning now to FIG. 4, an example method 400 for carrying out pressure based injector balancing (PBIB) diagnostic for the engine fuel injectors is shown. The method 400 enables the injection volume dispensed by the fuel injectors on the given fuel injection event to be accurately determined via monitoring of a change in fuel rail pressure (FRP) and used for balancing injector errors. Instructions for carrying out method 400 may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 402, the method 400 includes estimating and/or measuring engine operating conditions. Engine operating conditions may include but are not limited to one or more of engine speed, torque demand, manifold pressure, manifold air flow, ambient conditions (ambient temperature, pressure, and humidity, for example), engine dilution, exhaust-gas recirculate (EGR flow rate), and the like.

At 404, the method 400 includes determining if pressure based injector balancing (PBIB) conditions are met for the engine fuel injectors (such as direct injectors 252 or port fuel injectors 262 in FIG. 2). PBIB learning may be performed to learn a variation in injector fueling errors. As such, each injector may have an error between the commanded fuel mass to be delivered and the actual fuel mass that was delivered. By learning individual injector errors, the errors may be balanced so that all injectors move towards a common error value. In this way, cylinder fueling may become more uniform following the PBIB diagnostic. PBIB learning may be performed at selected conditions such as when engine speed is lower than a threshold speed, while injector pulse-width (PW) is lower than or greater than a threshold PW, and when multiple injectors are not scheduled to deliver concurrently. That is to say, injector fueling may be spaced during the PBIB diagnostic so that injections do not overlap. By doing this, a measured fuel rail pressure (FRP) drop may be associated to a single injector to determine an injected fuel mass. At high engine speeds or large fuel pulse-widths the DI injection periods may overlap, thus substantially eliminating an inter-injection period. In one example, the threshold speed and the threshold PW are based on non-zero, positive numbers. When injector overlap occurs, an inter-injection period ceases to exist, thereby preventing PBIB learning from being performed. If PBIB conditions are not confirmed, then at 406, the method 400 may include continuing fuel injection without performing PBIB.

If PBIB conditions are met, then the method 400 may include executing PBIB at a single PW at 408. In one example, the single PW may be equal to a PW greater than 0 μs. In some examples, additionally or alternatively, the single PW may be greater than a threshold PW, wherein the threshold PW is based on a PW outside of the ballistic (e.g., 0-300 μs) and transition (e.g., 300-600 μs) periods. In one embodiment, the single PW may be independent of a previous learned direct injector fueling error. The single PW may be selected based on one or more current engine conditions that dictate a fueling command.

In some examples, additionally or alternatively, the PW may be selected based on previous PBIB diagnostics. For example, if the previous PBIB diagnostics learned fueling amounts for PWs between 0-1500 μs, then the PW selected may be greater than 1500 μs. The selected PW may be commanded to each of the injectors included in the PBIB diagnostic. In this way, errors for a plurality of commanded PWs may be learned and tracked over time.

In previous examples, injection quantities may be varied continuously. In the present example, the direct injector PWs are the same. This is accomplished by selecting a direct injector PW that is common for all DI injectors for a period of time/conditions (e.g., based on current fueling demands). If the DI PW may normally vary between 1300 and 1500 us for a given condition, the example of method 400 may select 1500 us for all direct injectors, making up the balance for the requisite fuel with the port-fuel injection injectors. It may be desired to choose discrete DI PWs differing from one another by a threshold difference (e.g., 5 to 50%). Thus, the direct injector PW is held constant during conditions with a small variation in fuel commanded (e.g., between neighboring discrete direct injector PWs. Effectively, the direct injector PW is deadbanded to give it hysteresis, allowing the selected direct injector PW to be sticky.

In one example, the discrete PWs for learning the DI fueling error may be selected based on coverage of an entire lift region along with a desired spacing. For example, the PWs may range from 0 to 4000 μs, with a difference in nearest value PWs being equal to a threshold difference. In one example, the threshold difference is based on a non-zero, positive number between 5 and 50%, or 5 to 35%. In some examples, additionally or alternatively, the threshold difference is equal to exactly 20%. The PWs selected may be based on resistor/capacitor values that provide a logarithmic spread desired for ratio control of fuel/air.

In one example, the PBIB diagnostic of method 400 may include learning the fueling errors of the direct injectors or the port-fuel injectors. The PBIB routine may learn the errors of the direct injectors or the port-fuel injectors separately. That is to say, if the direct injectors are included in the PBIB diagnostic then the port-fuel injectors may be instructed to inject a remaining amount of commanded fuel. Thus, if the port-fuel injectors are included in the PBIB diagnostic, then the direct injectors may be instructed to inject the remaining amount of fuel. In the example of the present disclosure, the fueling errors of the direct injectors are learned and correction values are calculated and applied to a fueling parameters of the port-fuel injectors. It will be appreciated that the PBIB diagnostic may be executed for the port-fuel injectors as well. Errors learned with respect to the port-fuel injectors may further include also learning correction values. The correction values learned for the port-fuel injector errors may also be applied to the port-fuel injector fueling parameters.

At 410, the method 400 may include estimating a fueling amount for each injector. In one example, the fueling amount may be proportional to an FRP drop corresponding to each injector. The FRP drop may be calculated for each individual injector or it may be calculated as an average following a plurality of injections for the group of injectors. For example, if eight injectors inject fuel, then a drop-in FRP may be measured for eight injections, wherein the total drop-in FRP may be divided by the number of injections (e.g., eight).

At 412, the method 400 may include calculating a fueling offset for each injector. The fueling offset may be equal to a difference between the commanded fuel mass and the actual fuel mass. If the fueling offset is negative, then the actual fuel delivered is greater than the commanded fuel mass and over-fueling is taking place. If the fueling offset is positive, then the actual fuel delivered is less than the commanded fuel mass and under-fueling is taking place. If the fueling offset is zero, then the actual fuel delivered is equal to the commanded fuel mass.

At 414, the method 400 may include determining a PW correction value based on the fuel mass offset and a port-fuel injector transfer function. Applying the PW correction to a port-fuel injector results in a change in the port-fuel injector fuel mass equal to the calculated direct injector or port-fuel injector fuel mass offset. The PW correction value may be proportional to the fueling offset. For example, as the fueling offset increases, then the PW correction value may also increase. A positivity or a negativity of the PW correction value may match a positivity or a negativity of the fueling offset. Thus, if the fueling offset is negative, then the PW correction value may be a negative value.

At 416, the method 400 may include updating port-fuel injection parameters based on the PW correction. In this way, if the PBIB diagnostic learns port-fuel injector fueling errors, then the PW correction values are applied to port-fuel injection parameters. If the PBIB diagnostic learns direct injector fueling errors, then the PW correction values determined based on direct injector errors and port-fuel injector transfer function may be applied to port-fuel injection parameters. By doing this, an injected fuel mass of the port-fuel injectors may be adjusted based on the PW correction value being included in the updated port-fuel injection parameters.

At 418, the method 400 may include determining if PBIB conditions are still met. If PBIB conditions are still met, then at 420, the method 400 may include repeating PBIB at a different PW. For example, if the current PBIB learned a fueling error at 1200 μs, then the subsequent PBIB may include learning a fueling error at a different PW within the PW range (e.g., 0 to 4000 μs).

If the PBIB conditions are no longer met, then at 422, the method 400 may include updating for only learned PW correction values. For PW values that are not learned, PW correction values from the previous PBIB diagnostic may continue to be used. In some examples, additionally or alternatively, PW correction values may be gathered from other vehicles via a network. The vehicle and other vehicles may communicate with the network wirelessly via a modem, router, or other similar device over a communication network. Additionally or alternatively, vehicles may communicate directly with one another and transfer learned correction values for various PWs. In this way, the PW range may be learned in a piecewise manner via a plurality of vehicles sharing similar characteristics. Similar characteristics may include, but is not limited to, one or more of a location, a driver behavior, weather, a vehicle make, a vehicle model, a vehicle maintenance history, a vehicle operator sex, a vehicle operator age, and the like.

Turning now to FIG. 5, it shows a plurality of learned PBIB values. Table 500 illustrates a PW value signaled to the direct injectors during the diagnostic. The PW value for each of the direct injectors 1 through 8 is 1200 µs. Direct injectors 1 through 8 may each correspond to different cylinders. For example, direct injector 1 is positioned to inject directly into a first cylinder and direct injector 7 is positioned to inject directly into a seventh cylinder.

Table 510 illustrates fuel mass (Fm) delivered values for each of the direct injectors at the PW value. The fuel mass delivered may be calculated via a drop in FRP, measured from a pressure during an inter-injection period prior to an injection and a pressure measured during an inter-injection period following the injection. In one example, the inter-injection period corresponds to a period of time between injections. In the example of FIG. 5, the drop-in FRP is calculated for each of the injectors and not for the group as a whole.

Table 520 illustrates fueling offsets of each of the direct injectors. The fueling offset may be determined based on a difference between the commanded fuel mass and the actual fuel mass. In the example of FIG. 5, the commanded fuel mass may be equal to 10.607094 mg. Positive offset values correspond to under-fueling and negative offset values correspond to over-fueling. Thus, injectors 1, 2, 3, 5, and 7 are over-fueling and injectors 4, 6, and 8 are under-fueling.

Table 530 illustrates the direct injector fuel offsets being applied to the port-fuel injectors. For example, direct injector 5 and port-fuel injector 5 are positioned to provide fuel to a same cylinder. Direct injector 5 is over-fueling by 0.152344. Thus, in table 530, the offset for the port-fuel injector is calculated to balance the offset of the direct injector and is equal to −0.152344.

Table 540 illustrates the PW correction values converted from the fueling offset of table 530 being applied to a corresponding port-fuel injector. Thus, the fueling offset of the port-fuel injector, based on the fueling offset of the direct injector, is converted to a PW correction value In one example, if multiple port-fuel injectors are associated with the cylinder of the direct injector, then the PW correction value may be divided equally among the multiple port-fuel injectors. In the example of FIG. 5, the PW correction value is directly applied to the port-fuel injector fueling parameters. In some examples, the PW correction value. Equation 1 below illustrates an example of an adjusted port-fuel injector PW.

$$C_{PW} = I_{PW} - (\Delta PW) \tag{1}$$

The corrected commanded PW ($C_{PW}$) is equal to the initial PW (e.g., 1200 µs of table 500) minus the ΔPW of table 530. In the example of FIG. 5, the ΔPW may be rounded to the nearest tenth. In this way, the values illustrated in table 540 may correspond to an actual fuel mass equal to a commanded fuel mass provided when 1200 µs is desired via the diagnostic. This may result in corrected fueling parameters during engine operating parameters outside of the PBIB diagnostic.

Turning to FIG. 6, it shows a method 600 for adjusting engine fueling conditions in response to one or more conditions. In one example, the method 600 may be preceded by the method 400 of FIG. 4 such that the PW correction values of the direct injectors are learned.

At 602, the method 600 may include determining if an engine load is high. In one example, the engine load may be based on one or more of an accelerator pedal position, an engine speed, a manifold pressure, throttle position, and the like. For example, the engine load may be high if the throttle position corresponds to a fully open position. As another example, the engine load may be high if the manifold pressure is above a threshold pressure, wherein the threshold pressure is based on a non-zero, positive number.

If the engine load is not high, then port-fuel injectors may be active and at 604, the method 600 includes determining if the port-fuel injectors are degraded. In one example, one or more port-fuel injectors of a plurality of port-fuel injectors may be degraded, which may reduce an accuracy of a fueling therefrom. If none of the port-fuel injectors are degraded, then at 606, the method 600 may include maintaining current operating parameters. Furthermore, the PW correction values may be applied to the port-fuel injectors such that a PW signal to the port-fuel injectors is adjusted in proportion to the fueling offset of the direct injectors. Thus, for example, if the fueling error is learned at 1200 µs signaled to the direct injectors, then the PW signal to the port-fuel injector is adjusted based on the corresponding PW correction value.

In one example, additionally or alternatively, if the engine load is equal to a low load or an idle load, then it may be desired to deactivate the direct injectors such that port-fuel injectors are the only injectors supplying fuel to the engine. During conditions where the direct injectors are not fueling and the port-fuel injectors are active and fueling the engine, the PW correction value may not be used. As such, the port-fuel injector fueling parameters may not be adjusted based on the fueling error of the direct injectors when only the port-fuel injectors are active. In this way, port-fuel injector fueling parameters may be adjusted only in response to both the port-fuel injectors and the direct injectors being active.

Returning to 604, if one or more of the port-fuel injectors is degraded, then at 608, the method 600 may include adjusting direct injector fueling parameters based on a different PW correction value computed from the direct-injector fuel mass offset and the direct injector transfer function. As described above, due to the peak-to-peak variation of the direct injectors (which may not be accurately captured by the direct injector transfer function), the PW correction may not provide uniform fueling across the cylinders when directly applied to the direct injectors. In one example, only direct injectors with a corresponding port-fuel injector being degraded are adjusted, wherein the port-fuel injector and the direct injector correspond to one another when positioned to provide fuel to a same cylinder. Thus, if the port-fuel injector is operating as desired, then the PW correction value may be applied to the PW signal of the port-fuel injector and not the direct injector such that the fueling error of the direct injector is maintained. If the port-fuel injector is degraded, then a (different) PW correction value is applied to the PW signal of the direct injector and the fueling error is at least partially corrected.

Returning to 602, if the engine load is high, the port-fuel injections may not be desired. However, to maintain a uniformity of cylinder fueling, at 610, the method 600 may include not deactivating the port-fuel injectors. As such, one or more of the port-fuel injectors may be intrusively activated.

At 612, the method 600 may include signaling the port-fuel injectors to inject only the amount of fuel based on the PW correction value. If the PW correction value corresponds to a reduction in PW due to the direct injector over-fueling, then the corresponding port-fuel injector may be deactivated and a negative correction may be applied to the direct injector. In this way, some cylinders may receive both port-fuel and direct injections and other may receive only direct injections.

In this way, a fueling error of the direct injectors is learned at a given PW and a PW correction based on the fueling error and port-fuel injector transfer function is calculated. Fueling parameters for port-fuel injectors are adjusted based on the fueling error. More specifically, each cylinder may include at least one direct injector and at least one port-fuel injector, wherein the PW correction based on the error of the at least one direct injector is applied to the fueling parameters of the at least one port-fuel injector. The technical effect of applying the PW correction to the port-fuel injector is to balance fueling in the cylinders based on fueling errors of the direct injectors. In this way, the direct injectors may continue to commit fueling errors, wherein those errors are corrected via updates to fueling parameters of the port-fuel injectors.

An embodiment of a method includes adjusting only a fueling parameter of a plurality of port-fuel injectors based on a fueling error of a plurality of direct injectors while maintaining the fueling error of the plurality of direct injectors. A first example of the method further includes adjusting the fueling parameter of the plurality of port-fuel injectors includes adjusting a pulse-width signaled to a port-fuel injector. A second example of the method, optionally including the first example, further includes learning the fueling error during a pressure-based injector balancing diagnostic, wherein the learning comprises commanding a single, identical pulse-width to each of the plurality of direct injectors. A third example of the method, optionally including one or more of the previous examples, further includes determining a fuel rail pressure drop for each of the plurality of direct injectors. A fourth example of the method, optionally including one or more of the previous examples, further includes calculating a correction pulse-width for each of the plurality of port-fuel injectors based on the fueling error and a transfer function of the plurality of port-fuel injectors. A fifth example of the method, optionally including one or more of the previous examples, further includes where the adjusting only the port-fuel injector fueling parameter include adjusting a pulse-width signaled to a port-fuel injector positioned to inject into an intake port of a cylinder, wherein the pulse-width signaled is based on a combination of a reference direct injector pulse at which the fueling error is learned, a correction pulse-width calculated based on the fueling error of a direct injector of the plurality of direct injectors, and a port-fuel injector transfer function, wherein the direct injector is positioned to inject directly into the cylinder.

An embodiment of a system, comprises an engine comprising a plurality of cylinders, a plurality of port-fuel injectors and a plurality of direct injectors, wherein each cylinder of the plurality of cylinders includes at least one port-fuel injector of the plurality of port-fuel injectors and at least one direct injector of the plurality of direct injectors and a controller with computer-readable instructions stored on memory thereof that cause the controller to determine a fuel mass correction value for each of the plurality of direct injectors based on a fueling error thereof at a reference direct injector pulse-width (PW), and when the reference direct injector PW is signaled to a direct injector, adjust a PW signaled to a port-fuel injector of the plurality of port-fuel injectors based on the fuel mass correction value of the direct injector of the plurality of direct injectors, wherein the port-fuel injector and the direct injector fuel a same cylinder of the plurality of cylinders. A first example of the system further includes where the instructions further enable the controller to signal to the plurality of direct injectors to inject at only the reference PW when determining the fuel mass correction value. A second example of the system, optionally including the first example, further includes where the instructions further cause the controller to adjust the PW signaled to each of the plurality of port-fuel injectors in proportion to the fuel mass correction value determined for a direct injector arranged in a same cylinder. A third example of the system, optionally including one or more of the previous examples, further includes only fueling parameters for each of the plurality of port-fuel injectors are adjusted based on the fuel mass correction value, and wherein the fueling error of the plurality of direct injector is maintained. A fourth example of the system, optionally including one or more of the previous examples, further includes where the instructions further cause the controller to operate the plurality of port-fuel injectors to inject at least an amount of fuel corresponding to the fuel mass correction value. A fifth example of the system, optionally including one or more of the previous examples, further includes where the instructions further cause the controller to intrusively operate the port-fuel injectors during high engine loads. A sixth example of the system, optionally including one or more of the previous examples, further includes where fuel mass correction values are determined during a pressure-based injector balancing (PBIB) diagnostic, the fuel mass correction values are proportional to the fuel mass offset. A seventh example of the system, optionally including one or more of the previous examples, further includes where the port-fuel injectors are positioned to inject directly into an intake port of one cylinder of the plurality of cylinders, and wherein the direct injectors are positioned to inject directly into an interior volume of one cylinder of the plurality of cylinders. An eighth example of the system, optionally including one or more of the previous examples, further includes where the instructions further cause the controller to determine fuel mass correction values for the plurality of port-fuel injectors and update fueling parameters of the port-fuel injectors based on fuel mass correction values of the plurality of port-fuel injectors.

An embodiment of a method, comprises determining a pulse-width (PW) correction to be applied to a port-fuel injector based on a fueling offset of a direct injector learned during a diagnostic and a port-fuel injector transfer function, maintaining the fueling offset of the direct injector following the diagnostic, and applying the PW correction to injection parameters of only the port-fuel injector at a reference injection PW of the direct injector, wherein the port-fuel injector is positioned to inject in an intake port of a cylinder and the direct injector is positioned to inject into an interior volume of the cylinder. A first example of the method further includes where injection parameters of the direct injector are not adjusted, further comprising operating the port-fuel injector during all combusting events of an engine. A second example of the method, optionally including the first example, further includes where the reference injection PW is one of a subset of PWs within a range spanning 0 to 3900 µs, and wherein the PW correction is applied to the port-fuel injector when the direct injector is operating at the reference injection PW. A third example of the method, optionally including one or more of the previous examples, further includes where the fueling offset is based on a difference between a commanded fuel mass and an actual fuel mass delivered, the actual fuel mass delivered being proportional to a drop-in fuel-rail pressure (FRP). A fourth example of the method, optionally including one or more of the previous examples, further includes where applying the PW correction to injection parameters of the port-fuel injector includes increasing a PW of the port-fuel injector in response to an under-fueling of the direct injector, further comprising decreasing the PW of the port-fuel injector in response to an over-fueling of the direct injector.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
adjusting a pulse-width of a plurality of port-fuel injectors to change an amount of fuel injected by the port-fuel injectors by a correction value offsetting a fueling error of a plurality of direct injectors while maintaining the fueling error of the plurality of direct injectors.

2. The method of claim 1, further comprising learning the fueling error during a pressure-based injector balancing diagnostic, wherein the learning comprises commanding a single, identical pulse-width to each of the plurality of direct injectors.

3. The method of claim 2, further comprising determining a fuel rail pressure drop for each of the plurality of direct injectors.

4. The method of claim 3, further comprising calculating a correction pulse-width for each of the plurality of port-fuel injectors based on the fueling error.

5. The method of claim 1, wherein the pulse-width signaled is based on a combination of a reference direct injector pulse at which the fueling error is learned, a correction pulse-width calculated based on the fueling error of a direct injector of the plurality of direct injectors, and a port-fuel injector transfer function, and wherein the direct injector is positioned to inject directly into the cylinder.

6. A system, comprising:
an engine comprising a plurality of cylinders;
a plurality of port-fuel injectors and a plurality of direct injectors, wherein each cylinder of the plurality of cylinders includes at least one port-fuel injector of the plurality of port-fuel injectors and at least one direct injector of the plurality of direct injectors; and
a controller with computer-readable instructions stored on memory thereof that cause the controller to:
determine a fuel mass correction value for each of the plurality of direct injectors based on a fueling error thereof at a reference direct injector pulse-width (PW); and
when the reference direct injector PW is signaled to a direct injector, adjust a PW signal and operate a port-fuel injector of the plurality of port-fuel injectors to inject at least an amount of fuel corresponding to the fuel mass correction value of the direct injector of the plurality of direct injectors, wherein the port-fuel injector and the direct injector fuel a same cylinder of the plurality of cylinders.

7. The system of claim 6, wherein the instructions further enable the controller to signal to the plurality of direct injectors to inject at only the reference PW when determining the fuel mass correction value.

8. The system of claim 7, wherein the instructions further cause the controller to adjust the PW signaled to each of the plurality of port-fuel injectors in proportion to the fuel mass correction value determined for a direct injector arranged in a same cylinder.

9. The system of claim 7, wherein only pulse widths for each of the plurality of port-fuel injectors are adjusted based on the fuel mass correction value, and wherein the fueling error of the plurality of direct injector is maintained.

10. The system of claim 6, wherein the instructions further cause the controller to intrusively operate the port-fuel injectors during high engine loads.

11. The system of claim 6, wherein fuel mass correction values are determined during a pressure-based injector balancing (PBIB) diagnostic, and the fuel mass correction values are proportional to the fuel mass offset.

12. The system of claim 6, further comprising where the port-fuel injectors are positioned to inject directly into an intake port of one cylinder of the plurality of cylinders, and wherein the direct injectors are positioned to inject directly into an interior volume of one cylinder of the plurality of cylinders.

13. The system of claim 6, wherein the instructions further cause the controller to determine fuel mass correction values for the plurality of port-fuel injectors and update fueling parameters of the port-fuel injectors based on fuel mass correction values of the plurality of port-fuel injectors.

14. A method, comprising:
determining a pulse-width (PW) correction to be applied to a port-fuel injector based on a fueling offset of a direct injector learned during a diagnostic, the fueling offset based on a difference between a commanded fuel mass and an actual fuel mass delivered, the actual fuel mass delivered being proportional to a drop-in fuel-rail pressure (FRP);
maintaining the fueling offset of the direct injector following the diagnostic; and
applying the PW correction to injection parameters of only the port-fuel injector at a reference injection PW of the direct injector;
wherein the port-fuel injector is positioned to inject in an intake port of a cylinder and the direct injector is positioned to inject into an interior volume of the cylinder.

15. The method of claim 14, wherein injection parameters of the direct injector are not adjusted, further comprising operating the port-fuel injector during all combusting events of an engine.

16. The method of claim 14, wherein the reference injection PW is one of a subset of PWs within a range spanning 0 to 3900 µs, and wherein the PW correction is applied to the port-fuel injector when the direct injector is operating at the reference injection PW.

17. The method of claim 14, wherein applying the PW correction to injection parameters of the port-fuel injector includes increasing a PW of the port-fuel injector in response to an under-fueling of the direct injector, further comprising decreasing the PW of the port-fuel injector in response to an over-fueling of the direct injector.

* * * * *